US011467105B2

(12) United States Patent
Chen et al.

(10) Patent No.: US 11,467,105 B2
(45) Date of Patent: Oct. 11, 2022

(54) COMBINED SCANNING X-RAY GENERATOR, COMPOSITE INSPECTION APPARATUS, AND INSPECTION METHOD FOR HYBRID

(71) Applicant: NUCTECH COMPANY LIMITED, Beijing (CN)

(72) Inventors: Zhiqiang Chen, Beijing (CN); Wanlong Wu, Beijing (CN); Fuhua Ding, Beijing (CN); Zhimin Zheng, Beijing (CN); Xilei Luo, Beijing (CN)

(73) Assignee: NUCTECH COMPANY LIMITED, Beijing (CN)

( * ) Notice: Subject to any disclaimer, the term of this patent is extended or adjusted under 35 U.S.C. 154(b) by 135 days.

(21) Appl. No.: 17/054,025

(22) PCT Filed: May 10, 2019

(86) PCT No.: PCT/CN2019/086445
§ 371 (c)(1),
(2) Date: Nov. 9, 2020

(87) PCT Pub. No.: WO2019/214724
PCT Pub. Date: Nov. 14, 2019

(65) Prior Publication Data
US 2021/0302335 A1 Sep. 30, 2021

(30) Foreign Application Priority Data

May 10, 2018 (CN) .......................... 201810441775.0
May 10, 2018 (CN) .......................... 201810445533.9
May 10, 2018 (CN) .......................... 201810447687.1

(51) Int. Cl.
*G01N 23/04* (2018.01)
*G01N 23/083* (2018.01)
(Continued)

(52) U.S. Cl.
CPC ....... *G01N 23/20083* (2013.01); *G01N 23/04* (2013.01); *G01N 23/083* (2013.01);
(Continued)

(58) Field of Classification Search
None
See application file for complete search history.

(56) References Cited

U.S. PATENT DOCUMENTS 3,591,821 A 7/1971 Seiki et al.
4,899,354 A * 2/1990 Reinhold ............... H01J 35/112
378/34
(Continued)

FOREIGN PATENT DOCUMENTS

CN 103808739 A 5/2014
CN 205508765 U 8/2016
(Continued)

OTHER PUBLICATIONS

Extended European Search Report for EP Application No. 19799211.8 dated Dec. 15, 2021 (8 pages).
(Continued)

*Primary Examiner* — Thomas R Artman
(74) *Attorney, Agent, or Firm* — Merchant & Gould P.C.

(57) ABSTRACT

Embodiments of the present disclosure disclose a combined scanning X-ray generator, a composite inspection apparatus and an inspection method. The combined scanning X-ray generator includes: a housing; an anode arranged in the housing, the anode including a first end of the anode and a second end of the anode opposite the first end of the anode; a pencil beam radiation source arranged at the first end of the anode and configured to emit a pencil X-ray beam; and a fan beam radiation source arranged at the second end of the anode and configured to emit a fan X-ray beam; wherein the
(Continued)

pencil beam radiation source and the fan beam radiation source are operated independently.

20 Claims, 8 Drawing Sheets

(51) Int. Cl.
*G01N 23/10* (2018.01)
*G01N 23/20* (2018.01)
*G01N 23/203* (2006.01)
*G01V 5/00* (2006.01)
*H05G 1/58* (2006.01)
*H01J 35/08* (2006.01)
*H01J 35/16* (2006.01)
*G21K 1/04* (2006.01)
*H01J 35/12* (2006.01)

(52) U.S. Cl.
CPC .......... *G01N 23/10* (2013.01); *G01N 23/203* (2013.01); *G01V 5/0025* (2013.01); *G21K 1/043* (2013.01); *H01J 35/112* (2019.05); *H01J 35/16* (2013.01); *H05G 1/58* (2013.01); *G01N 2223/045* (2013.01); *G01N 2223/053* (2013.01); *G01N 2223/1016* (2013.01); *G01N 2223/316* (2013.01); *G01N 2223/3301* (2013.01); *G01N 2223/40* (2013.01); *G01N 2223/639* (2013.01); *H01J 35/13* (2019.05); *H01J 2235/023* (2013.01); *H01J 2235/068* (2013.01); *H01J 2235/086* (2013.01); *H01J 2235/1204* (2013.01); *H01J 2235/1262* (2013.01); *H01J 2235/166* (2013.01); *H01J 2235/168* (2013.01)

(56) References Cited

U.S. PATENT DOCUMENTS

| | | | |
|---|---|---|---|
| 6,188,747 B1* | 2/2001 | Geus | H01J 35/112 |
| | | | 378/124 |
| 6,192,104 B1* | 2/2001 | Adams | G01N 23/203 |
| | | | 378/57 |
| 6,546,072 B1 | 4/2003 | Chalmers | |
| 7,476,023 B1* | 1/2009 | Canfield | H05G 1/02 |
| | | | 378/9 |
| 8,953,746 B2* | 2/2015 | Roshi | H01J 35/24 |
| | | | 378/125 |
| 10,345,479 B2* | 7/2019 | Langeveld | G01V 5/0041 |
| 2012/0269319 A1* | 10/2012 | Grodzins | G01N 23/203 |
| | | | 378/146 |
| 2016/0223706 A1 | 8/2016 | Franco et al. | |
| 2017/0131428 A1* | 5/2017 | Langeveld | G01V 5/0041 |
| 2021/0302335 A1* | 9/2021 | Chen | G01N 23/20083 |

FOREIGN PATENT DOCUMENTS

| | | |
|---|---|---|
| CN | 108318512 A | 7/2018 |
| CN | 108389768 A | 8/2018 |
| CN | 108426899 A | 8/2018 |
| CN | 208189522 U | 12/2018 |
| CN | 208607165 U | 3/2019 |
| CN | 208607167 U | 3/2019 |

OTHER PUBLICATIONS

International Search Report and Written Opinion of the International Searching Authority for International Patent Application No. PCT/CN2019/086445, dated Aug. 16, 2019, 12 pages.

\* cited by examiner

COMBINED SCANNING X-RAY GENERATOR, COMPOSITE INSPECTION APPARATUS, AND INSPECTION METHOD FOR HYBRID

CROSS-REFERENCE TO RELATED APPLICATION

This application is a U.S. National Stage Application of International Application No. PCT/CN2019/086445, filed on May 10, 2019, entitled "COMBINED SCANNING X-RAY GENERATOR, COMPOSITE INSPECTION APPARATUS, AND INSPECTION METHOD" which claims priority to Chinese Application No. 201810441775.0, filed on May 10, 2018, Chinese Application No. 201810445533.9, filed on May 10, 2018, and Chinese Application No. 201810447687.1, filed on May 10, 2019, and which applications are incorporated herein by reference in their entirety. A claims of priority is made to each of the above disclosed applications.

TECHNICAL FIELD

Embodiments of the present disclosure relate to a field of radiation generation technology, in particular to a combined scanning X-ray generator, a composition inspection apparatus, and an inspection method.

BACKGROUND

X-ray transmission and backscatter imaging technologies have been widely used in the security inspection field. Transmission imaging technology has good penetrability and high spatial resolution. According to the different attenuation degrees of X-rays after passing through different substances, the transmission imaging technology is sensitive to copper and iron and other high atomic number substances. The imaging is clear, and the identification effect is good. Backscatter imaging technology has low radiation dose and good safety. Although its penetration ability is limited, the backscatter imaging technology is more sensitive to low atomic number substances and has a good detection effect for drugs, gasoline and explosives. In addition, the backscatter imaging technology adopts spot beam scanning, so it is necessary to modulate a fan beam or cone beam generated by a conventional X-ray generator into a pencil beam.

When the X-ray transmission and backscatter imaging technologies are used separately, due to their inherent defects, missed detections will inevitably occur. With the increasingly severe security situation, the requirements for security inspection apparatuses are getting higher and higher, so there is a need for an integration of the X-ray transmission and backscatter imaging technologies. This can expand the detection range and improve the detection performance.

SUMMARY

The present disclosure provides a combined scanning X-ray generator, including: a housing; an anode arranged in the housing, the anode including a first end of the anode and a second end of the anode opposite the first end of the anode; a pencil beam radiation source arranged at the first end of the anode and configured to emit a pencil X-ray beam, wherein the pencil beam radiation source includes a first cathode configured to emit electrons toward the first end of the anode in the pencil beam radiation source; and a fan beam radiation source arranged at the second end of the anode and configured to emit a fan X-ray beam, wherein the fan beam radiation source includes a second cathode configured to emit electrons toward the second end of the anode in the fan beam radiation source; wherein the pencil beam radiation source and the fan beam radiation source are operated independently.

According to an aspect of the present disclosure, an embodiment of the present disclosure provides a composite inspection apparatus, including a plurality of inspection channels and at least one combined scanning X-ray generator as described above, wherein, each combined scanning X-ray generator is configured to emit a pencil X-ray beam applicable to perform a backscatter scanning on a target to be inspected in one of the plurality of inspection channels and a fan X-ray beam applicable to perform a transmission scanning on a target to be inspected in another of the plurality of inspection channels.

According to an aspect of the present disclosure, an embodiment of the present disclosure provides a composite inspection apparatus, including a first inspection channel, a second inspection channel, a combined scanning X-ray generator as described above arranged between the first inspection channel and the second inspection channel, and corresponding detectors, wherein the combined scanning X-ray generator is configured to emit a pencil X-ray beam applicable to perform a backscatter scanning on a target to be inspected in the first inspection channel and is configured to emit a fan X-ray beam applicable to perform a transmission scanning on a target to be inspected in the second inspection channel.

According to an aspect of the present disclosure, an embodiment of the present disclosure provides an inspection method for a target to be inspected by using the above-mentioned composite inspection apparatus, the method including:

passing a first target to be inspected through one of the inspection channels, so as to perform the backscatter scanning on the first target to be inspected by using the pencil X-ray beam; and passing a second target to be inspected through the other inspection channel, so as to perform the transmission scanning on the second target to be inspected by using the fan X-ray beam.

According to an aspect of the present disclosure, an embodiment of the present disclosure provides a composite inspection apparatus for a human body, including:

the above-mentioned combined scanning X-ray generator configured to independently generate the pencil X-ray beam for backscatter detection and the fan X-ray beam for transmission detection, wherein the pencil X-ray beam is configured to scan a fan area, and the fan X-ray beam has a fan contour covering a fan area;

a first detector configured to detect a pencil X-ray beam scattered by the human body; and a second detector configured to detect a fan X-ray beam transmitted through the human body;

wherein an inspection channel for the human body to be inspected is defined between the first detector and the second detector.

According to an aspect of the present disclosure, an embodiment of the present disclosure provides an inspection method for a human body, including performing a human body inspection by using the above-mentioned composite inspection apparatus, wherein the inspection method includes:

using a scanning X-ray generator to emit a pencil X-ray beam to perform a backscatter detection; and if necessary, using the scanning X-ray generator to emit a fan X-ray beam to perform a further transmission detection on the human body.

According to an aspect of the present disclosure, an embodiment of the present disclosure provides a method of inspecting a target to be inspected by using the above-mentioned composite inspection apparatus, the method including:

subsequent to a backscatter scanning of the target to be inspected, performing a transmission scanning of the target to be inspected; or subsequent to a transmission scanning of the target to be inspected, performing a backscatter scanning on the target to be inspected.

BRIEF DESCRIPTION OF THE
ACCOMPANYING DRAWINGS

Figure 7:
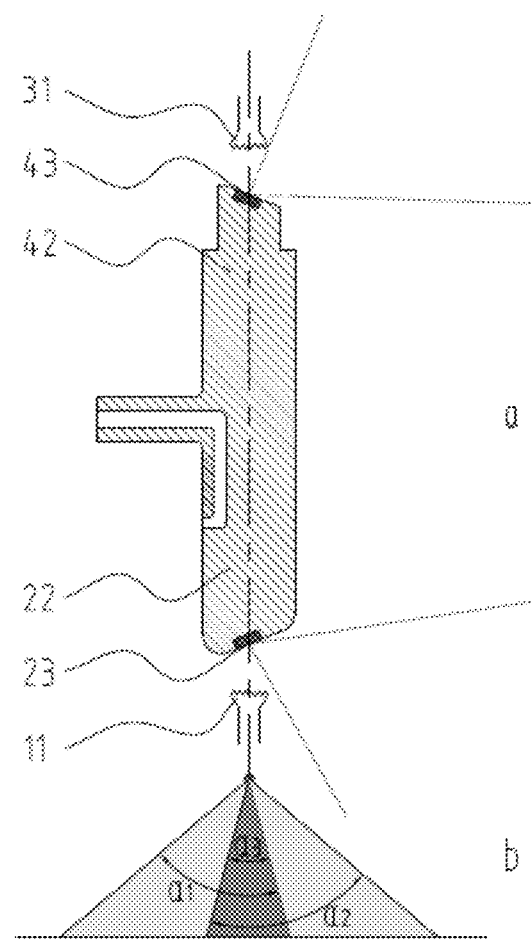

FIG. 7 shows a schematic view of a positional relationship of the X-ray beams at both ends of the combined scanning X-ray generator according to an embodiment of the present disclosure, wherein part a in FIG. 7 shows a schematic view of the X-ray beams at both ends, and part b in FIG. 7 shows a positional relationship between an opening angle of the pencil X-ray beam scanning range and an opening angle of the fan X-ray beam scanning range.

Figure 8:
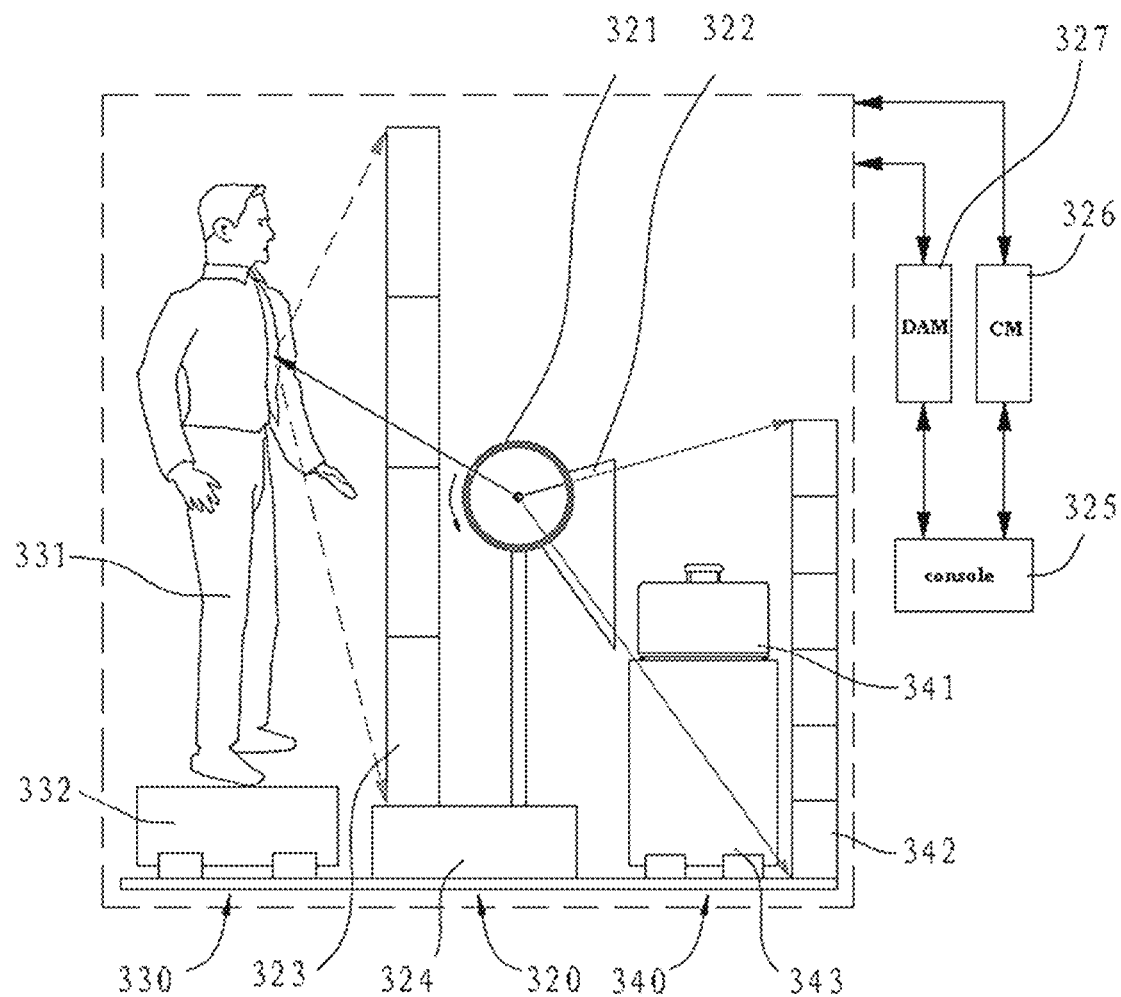
Figure 9:
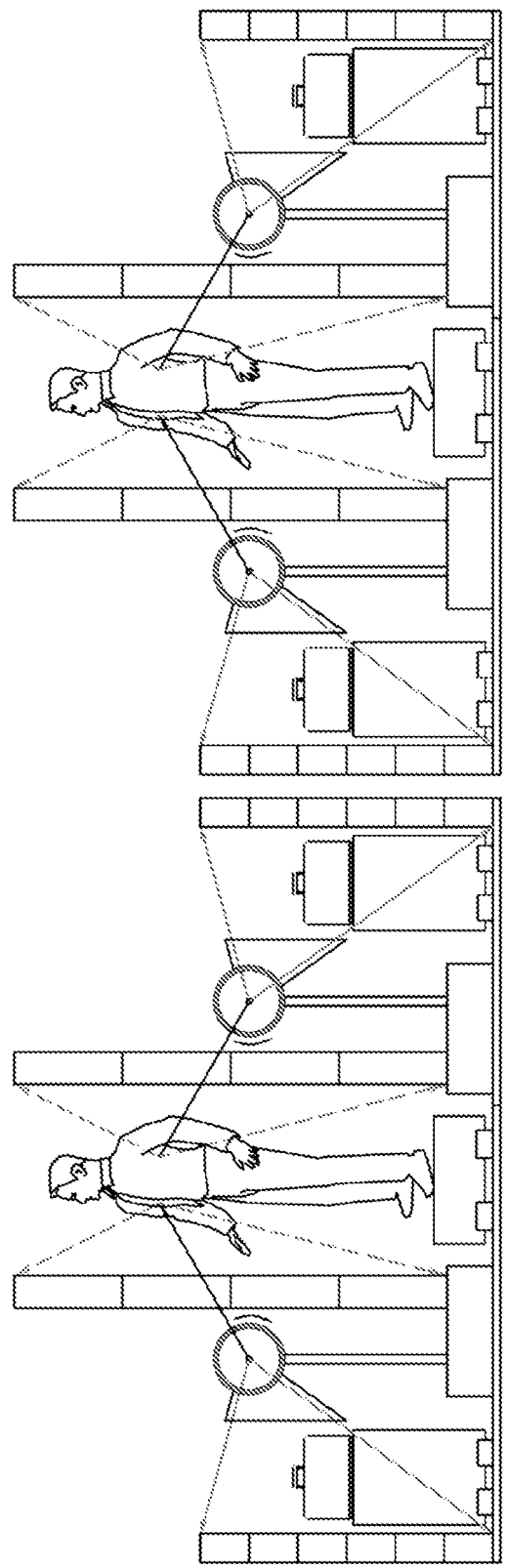
Figure 10:
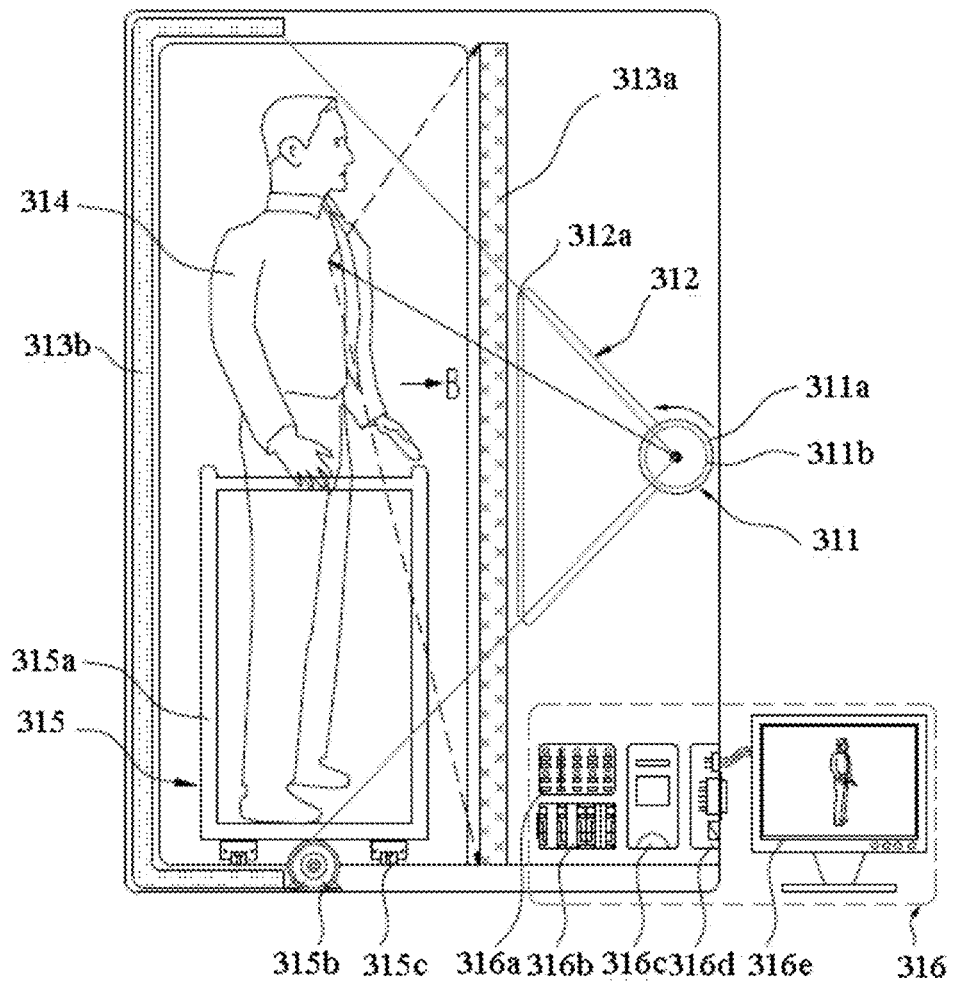
Figure 11:
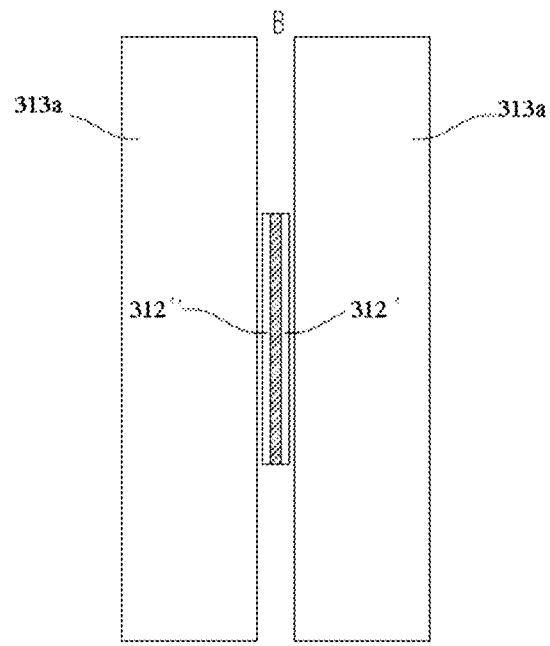
Figure 12:
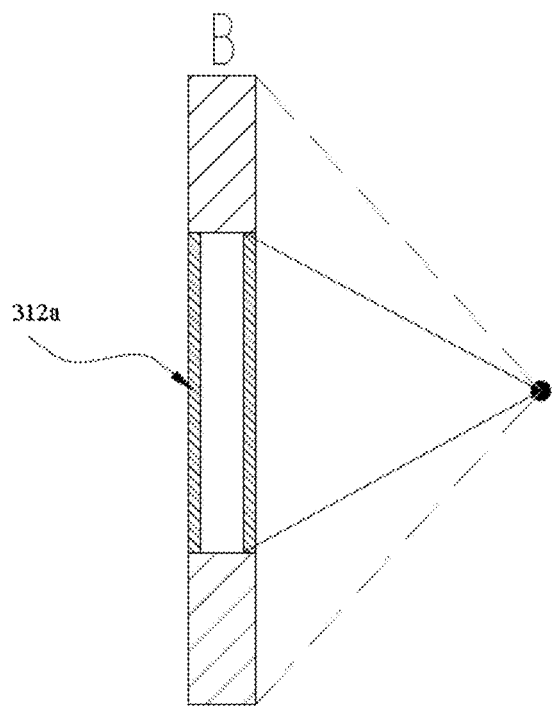

FIG. 8 is a schematic view of an overall configuration and use method of a dual-channel composite inspection apparatus according to an embodiment of the present disclosure;

FIG. 9 is a schematic view of a state in which the dual-channel composite inspection apparatus of the embodiment of the present disclosure is used in cascade;

FIG. 10 shows a schematic view of a composite inspection apparatus for a human body according to an embodiment of the present disclosure;

FIG. 11 shows a schematic view of a first detector of the embodiment of the present disclosure when viewed from a direction B in FIG. 8; and FIG. 12 shows a schematic cross-sectional view of an adjuster of an inspection apparatus collimator of the fan beam radiation source of the scanning X-ray generator according to an embodiment of the present disclosure.

DETAILED DESCRIPTION

Although the present disclosure allows various modifications and alternatives, its specific embodiments are shown in the drawings by way of example and will be described in detail herein. However, it should be understood that the accompanying drawings and detailed description are not intended to limit the present disclosure to the specific forms disclosed, but on the contrary, they are intended to cover all modifications, equivalents, and alternatives falling within the spirit and scope of the present disclosure defined by the appended claims. The drawings are for illustration and are not drawn to scale.

The terms "upper", "lower" and the like are used in this specification not to limit the absolute orientation of the element, but to describe the relative position of the element in the view to help understanding. In this specification, "top side" and "bottom side" refer to the orientation of the upper side and the lower side of an upright object in general.

A number of embodiments according to the present disclosure will be described below with reference to the drawings.

Figure 1:
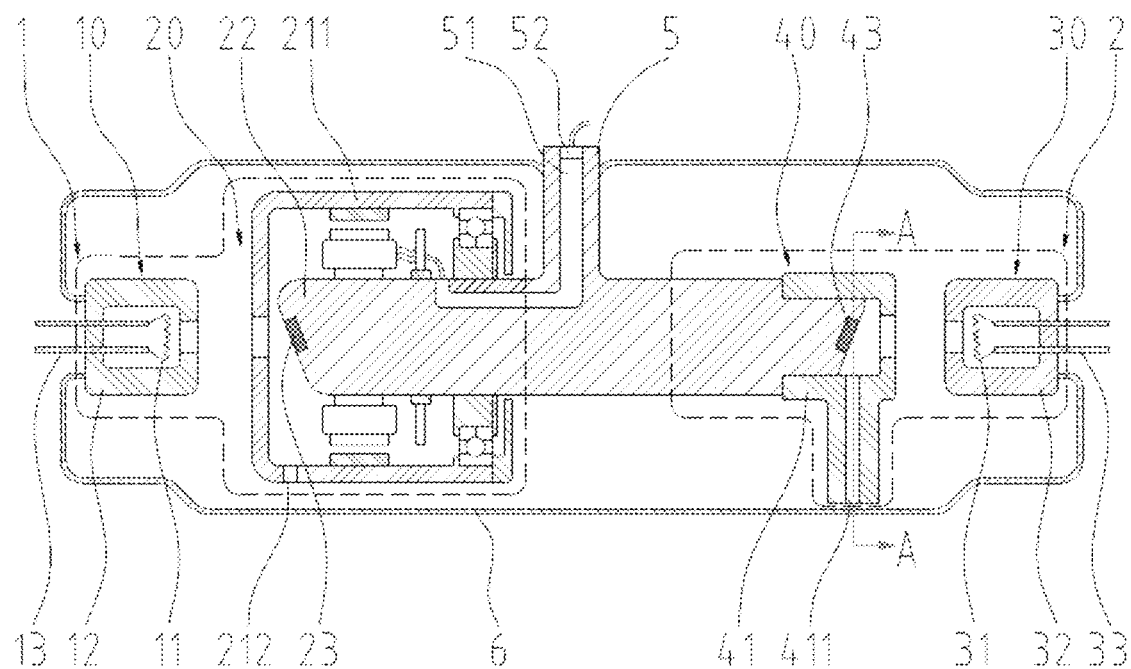
FIG. 1 shows a schematic cross-sectional view of a combined scanning X-ray generator according to an embodiment of the present disclosure.

Referring to FIG. 1, FIG. 1 shows a combined scanning X-ray generator according to an embodiment of the present disclosure, including: a housing; an anode arranged in the housing, the anode including a first end of the anode and a second end of the anode opposite the first end of the anode; a pencil beam radiation source arranged at the first end of the anode and configured to emit a pencil X-ray beam, wherein the pencil beam radiation source includes a first cathode configured to emit electrons toward the first end of the anode in the pencil beam radiation source; and a fan beam radiation source arranged at the second end of the anode and configured to emit a fan X-ray beam, wherein the fan beam radiation source includes a second cathode configured to emit electrons toward the second end of the anode in the fan beam radiation source. In this embodiment, the combined scanning X-ray generator may emit two beams of X-rays to simultaneously irradiate two objects by a single X-ray tube. Compared with the prior art where two sets of X-ray generating devices are required, it may save space and is particularly advantageous for occasions with limited sites. Furthermore, the combined scanning X-ray generator of this embodiment may provide the pencil X-ray beam and the fan X-ray beam at the same time, so that the combined scanning X-ray generator may be used more widely and has improved adaptability. In this embodiment, the pencil beam radiation source and the fan beam radiation source may be regarded as sharing the same anode.

Further, a pencil beam radiation source 1 and a fan beam radiation source 2 may be operated independently. For example, the pencil beam radiation source 1 and the fan beam radiation source 2 may be operated at the same time or in a certain time sequence. They may also emit X-ray beams of the same energy or respectively emit X-ray beams of different energies. These configurations will enable the combined scanning X-ray generator to be used more flexibly and adapt to different needs, and the functions of two X-ray generating devices are truly realized through one combined scanning X-ray generator.

Components of the combined scanning X-ray generator of the present disclosure are packaged in a housing 6. It is also possible that the pencil beam radiation source 1 and the fan beam radiation source 2 are respectively packaged in two housing parts respectively sealed and connected with both end parts of an anode stem 5.

In one embodiment of the present disclosure, a first cathode 10 may be regarded as a part of the pencil beam radiation source 1, and a second cathode 30 may be regarded as a part of the fan beam radiation source 2. The first cathode 10 includes a first filament 11, a first focusing cover 12 and a first filament lead 13. The second cathode 30 includes a second filament 31, a second focusing cover 32 and a second filament lead 33. The first filament lead 13 and the second filament lead 33 are used to externally connect a filament power supply and a negative electrode of a high voltage power supply. In one embodiment, the first filament 11 is connected to a negative electrode of a high voltage power supply and a filament power supply to emit electrons, and the second filament 31 is connected to the negative electrode of the same high voltage power supply and the filament power supply to emit electrons. In another embodiment, the first filament 11 is connected to a negative electrode of a high voltage power supply and a filament power supply to emit electrons, and the second filament 31 is connected to the negative electrode of another high voltage power supply and the filament power supply to emit electrons, so that the voltages and currents of the first filament 11 and the second filament 31 may be controlled separately, so as to realize the independent operation of the pencil beam radiation source 1 and the fan beam radiation source 2 described above. The first focusing cover 12 and the second focusing cover 32 may focus electrons and also serve to support the cathodes. The first focusing cover 12 is provided with an opening for electron emission, and other parts thereof are sealed, so that the electrons will not be scattered into the environment. The second focusing cover 32 is similar. In one embodiment, centers of the first filament 11, the second filament 31, a first target 23 and a second target 43 are located on the same horizontal straight line. As shown in FIG. 1, one end of the housing 6 is welded to the first focusing cover 12, and the other end of the housing 6 is welded to the second focusing cover 32. The housing 6 can be made of hard glass, corrugated ceramic, or cermet. In one embodiment, in order to reduce the loss of the X-ray beam and improve its output efficiency and dose performance, the part of the housing 6 for transmitting X-rays may be embedded with a beryllium window.

According to the embodiment of the present disclosure, the pencil beam radiation source 1 and the fan beam radiation source 2 may be operated independently, and thus, the energies of the two X-ray beams emitted by the combined scanning X-ray generator may be controlled separately.

For example, in one embodiment, a voltage applied between the first cathode 10 and the first end 20 of the anode is equal to a voltage applied between the second cathode 30 and the second end 40 of the anode, so that the X-rays generated by the pencil beam radiation source 1 and the fan beam radiation source 2 have the same energy.

In another embodiment, the combined scanning X-ray generator is configured such that the voltage applied between the first cathode 10 and the first end 20 of the anode is not equal to the voltage applied between the second cathode 30 and the second end 40 of the anode, so that the X-rays generated by the pencil beam radiation source 1 and the fan beam radiation source 2 have different energies.

For example, in the case of detecting two different objects, where one object is subject to backscatter detection and the other object is subject to transmission detection, the combined scanning X-ray generator of this embodiment can simultaneously emit the pencil X-ray beam and the fan X-ray beam of different energies to perform the detection, which improves the detection efficiency, enhances the adaptability of the combined scanning X-ray generator, and greatly improves the application range of the apparatus.

In this embodiment, the pencil beam radiation source 1 includes a first target 23 arranged on an end surface of the first end 20 of the anode. The first target 23 emits X-rays after being bombarded by electrons. The fan beam radiation source 2 includes a second target 43 arranged on an end surface of the second end 40 of the anode. The second target 43 emits X-rays after being bombarded by electrons. In this embodiment, the end surface of the first end is not perpendicular to a length extending direction of the anode, and the end surface of the second end is not perpendicular to the length extending direction of the anode. In this embodiment, the pencil beam radiation source 1 and the fan beam radiation source 2 may be operated independently, so that the first target 23 and the second target 43 may emit X-rays synchronously or asynchronously.

In one embodiment, the pencil beam radiation source 1 includes a protective drum 211 configured to modulate the X-rays emitted by the first target 23 into a pencil X-ray beam. The fan beam radiation source 2 includes a collimator 41 configured to modulate the X-rays emitted by the second target 43 into a fan X-ray beam.

When the electrons of the first cathode 10 bombard the first target 23, the first target 23 generates X-rays. A collimator is arranged in front of the first target 23 to limit the X-rays emitted by the first target 23 within a certain range. For clarity, FIG. 1 does not show a collimator arranged in front of the first target 23 to limit the X-ray emission range. However, it should be understood that the X-rays emitted by the first target 23 may be fan X-rays. An opening angle of the collimator determines an opening angle of a plane beam of the fan X-rays emitted. The protective drum 211 surrounds the first end 20 of the anode, allowing the electrons to pass through the end surface of the protective drum 211. For example, the end surface is provided with an opening or hole to allow the electrons bombard the first target 23 and limit the X-rays emitted by the first target 23, so that the X-rays emitted by the first target 23 can only be emitted from a protective drum exit hole 212 to form the pencil X-ray beam. The protective drum 211 is configured to be rotatable around the first end 20 of the anode, so that the pencil X-ray beam formed through the protective drum exit hole 212 scans within a certain angle range.

Figure 3:
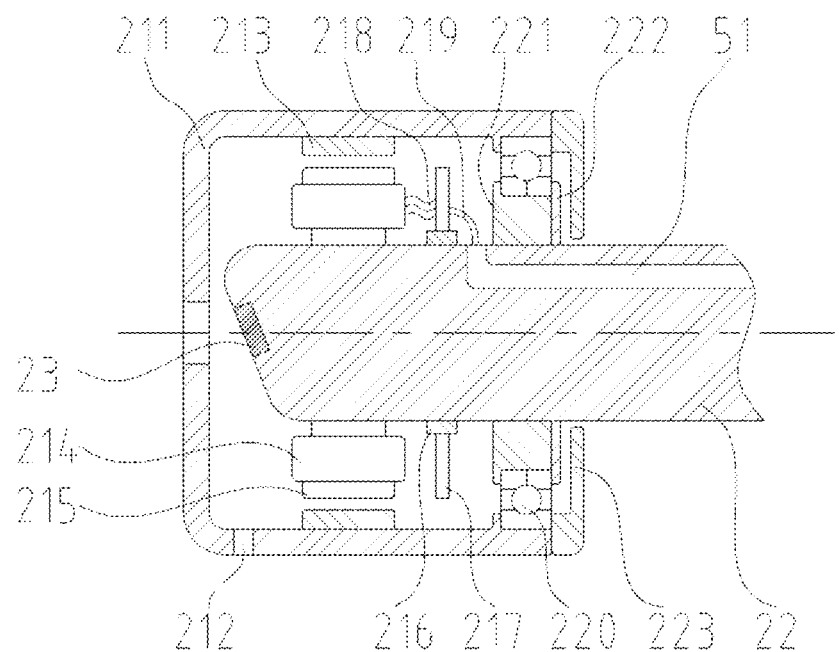
FIG. 3 shows a schematic cross-sectional view of a protective drum at a first end of the anode of the combined scanning X-ray generator according to an embodiment of the present disclosure.

As shown in FIG. 3, the pencil beam radiation source 1 further includes an armature core 215 arranged on the anode near the first end 20 of the anode, an armature winding 214 surrounding the armature core 215, and a plurality of permanent magnets 213 arranged corresponding to the armature core 215 on an inner wall of the protective drum 211, so that when the armature winding 214 forms a changing magnetic field, the armature winding 214 interacts with the plurality of permanent magnets 213 to drive the protective drum 211 to rotate around the first end 20 of the anode.

As shown in FIG. 3, in one embodiment, a portion of the first end 20 of the anode away from the first target 23 is opened with a routing pipeline 51. One end of a driver 217 is connected to the armature winding 214 through a cable 218, and a cable 219 at the other end is connected to an inner side of a sealing joint 52 through the routing pipeline 51. After energization, the armature winding 214 continuously commutates and energizes to form a rotating magnetic field, which interacts with the magnetic fields generated by the plurality of permanent magnets 213 to push the protective drum 211 to make a circular motion with a centerline of the first end 20 of the anode as an axis. In this way, the fan X-ray beam is modulated into a pencil X-ray beam in a scanning state by the rotation movement of the protective drum exit hole 212.

Figure 2:
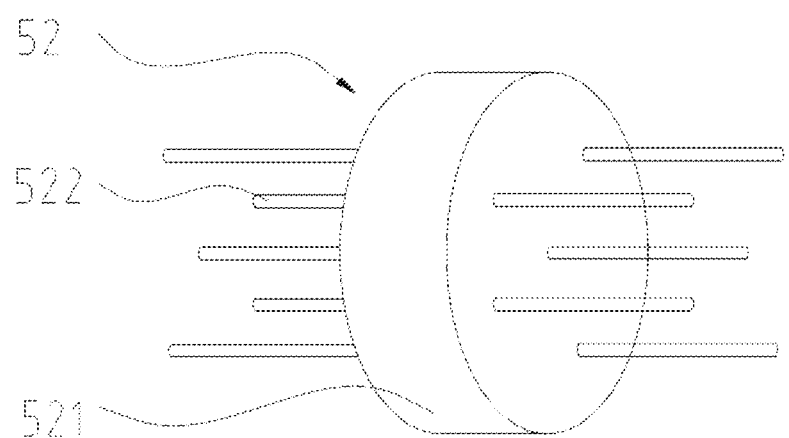
FIG. 2 shows a schematic view of a sealing joint according to an embodiment of the present disclosure.

In one embodiment, the anode of the combined scanning X-ray generator further includes an anode stem 5 connected with the housing 6 to fix the anode inside the housing 6. A routing channel 51 may be provided in the anode stem 5. The anode stem 5 includes a sealing joint 52, as shown in FIG. 2, composed of a glass stem 521 and a conductive lead pin 522 sintered and sealed therein. The glass stem 521 is fused with the anode stem 5 into a closed whole through sintering and other processes. One end of the conductive lead pin 522 is connected to an inner wire of the pencil beam radiation source 1, and the other end is connected to the outside of the X-ray tube. This lead wire ensures that the inside of the X-ray tube is in a vacuum state. In addition, other sealing and fixing fashions are also available, such as flange extruded O-ring seals.

The protective drum 211 and an outer top ring 223 can be made of tungsten or tungsten alloy materials, so that the protective drum 211 and the outer top ring 223 together can effectively achieve X-ray radiation protection.

In one embodiment, the first end 20 of the anode, a sleeve 221 and an inner top ring 222 are preferably made of red copper or copper alloy material, which facilitates heat dissipation and has a certain X-ray radiation protection capability.

In one embodiment, the sleeve 221 is sleeved near the first end 20 of the anode, a bearing 220 is sleeved on the sleeve 221, and an inner wall of an inner ring of the bearing 220 sleeves the sleeve 221. The inner ring of the bearing 220 is restricted by an upper shoulder of the sleeve 221 and the inner top ring 222, and the outer ring is restricted by a convex edge of the protective drum 211 and the outer top ring 223. The protective drum 211 is installed through an outer wall of an outer ring of the bearing 220. A number of permanent magnets 213 are fastened on the inner wall of the protective drum 211, and they are uniformly distributed. The driver 217 is placed on one side of the armature core 215 and is fixed on the first end 20 of the anode through a collar 216. A routing hole 51 is opened on one side of the target 23. One end of the driver 217 is connected to the armature winding 214 through the cable 218, and the cable 219 at the other end is connected to the inner side of the sealing joint 52 through the routing hole 51. After energization, the armature winding 214 continuously commutates and energizes to form a rotating magnetic field, which interacts with the magnetic field generated by the permanent magnets 213 to push the protective drum 211 to make a circular motion with the centerline of a first anode rod 22 as an axis. In this way, the fan X-ray beam is modulated into a continuous pencil X-ray beam by the rotation movement of the protective drum exit hole 212.

The protective drum 211, the sleeve 221, the outer top ring 223 and the first anode rod 22 form a nearly closed X-ray shielding room with good performance.

As shown in FIG. 1, the collimator 41 surrounds the second end 40 of the anode, allowing the electrons to pass through the collimator 41 to bombard the second target 43, and restricting the X-rays emitted by the second target 43, so that the X-rays emitted by the second target 43 can only be emitted from a collimator outlet 411 to form the fan X-ray beam.

Figure 4:
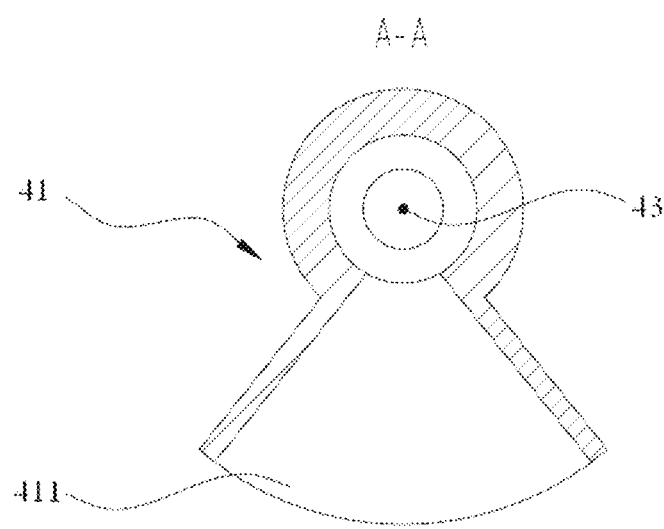
FIG. 4 shows a schematic cross-sectional view of a collimator at a second end of the anode of the combined scanning X-ray generator according to an embodiment of the present disclosure.

FIG. 4 shows a cross-sectional view of the collimator 41. As shown in FIG. 4, the collimator 41 has a fan-shaped opening, that is, the collimator outlet 411. The shape of the collimator outlet 411 determines a profile of the X-ray beam emitted. An end surface of the collimator 41 is also provided with an opening or hole that allows the electrons to be injected into the collimator 41. The electrons are injected from the opening or hole on the end surface of the collimator 41 to bombard the second target 43, thereby generating X-rays. The collimator 41 may have other shapes. However, the collimator 41 needs to shield the scattered electrons and generated X-rays, not only to prevent damage to the surrounding environment by the electrons and rays, but also to generate the desired X-ray beam. The collimator 41 can be made of tungsten or tungsten alloy material, which can effectively realize X-rays protection.

According to the embodiment of the present disclosure, the protective drum 211 and the collimator 41 may respectively modulate the X-rays emitted from the first target 23 and the second target 43, including modulating the opening angle, emission direction and other features of the fan X-ray beam formed. It should be known that the protective drum 211 and the collimator 41 control the shape and direction of the X-ray beam, and the energy of the X-ray beam is controlled by the high voltage power supply between the anode and the cathode. When the energy of the electrons bombarding the first target 23 is high, the energy of the X-rays emitted by the first target 23 is high. Thus, by controlling the voltage between the anode and the cathode and setting the structure and orientation of the protective drum 211 and the collimator 41, the desired X-ray beam can be obtained at both ends of the combined scanning X-ray generator. In the combined scanning X-ray generator as shown in FIG. 1, a first collimator may be provided in front of the first target 23 at the first end 20 of the anode. The first collimator limits or shapes the X-rays emitted by the first target 23, for example, forming a first fan X-ray beam. The first fan X-ray beam is then passed through the protective drum 211 to form a pencil X-ray beam. A ray exit opening angle of the first collimator defines a scanning range of the pencil X-ray beam.

Figure 5:
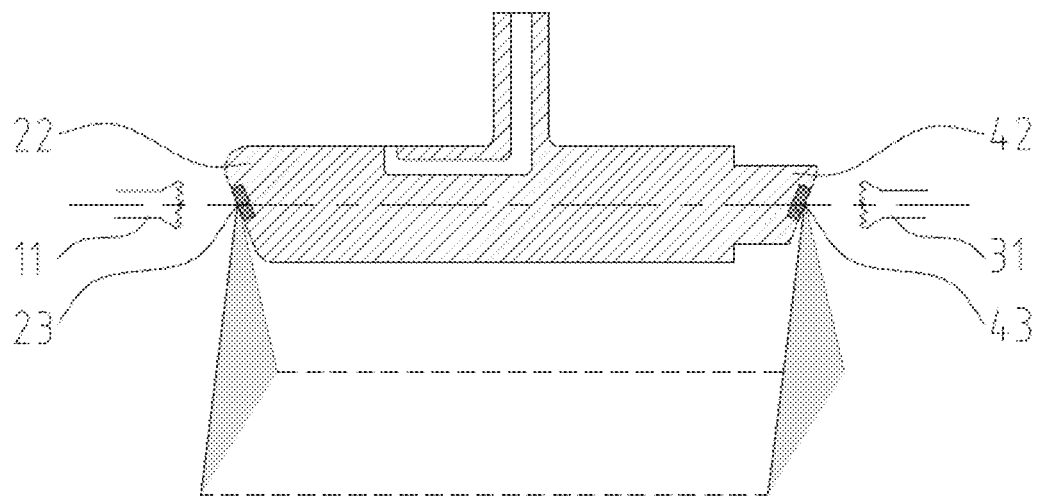
FIG. 5 shows a schematic view of X-ray beams at both ends of the combined scanning X-ray generator according to an embodiment of the present disclosure.

In one embodiment, the pencil X-ray beam emitted from the protective drum exit hole 212 and the fan X-ray beam emitted from the collimator outlet 411 are separately located in two parallel planes. As shown in FIG. 5, the X-rays emitted from the first end 20 of the anode and the second end 40 of the anode are downward and located in two parallel planes. It should be understood that FIG. 5 is only for illustration, and the X-rays emitted from the first end 20 of the anode and the second end 40 of the anode may be simultaneously upward and located in two parallel planes.

Figure 6:
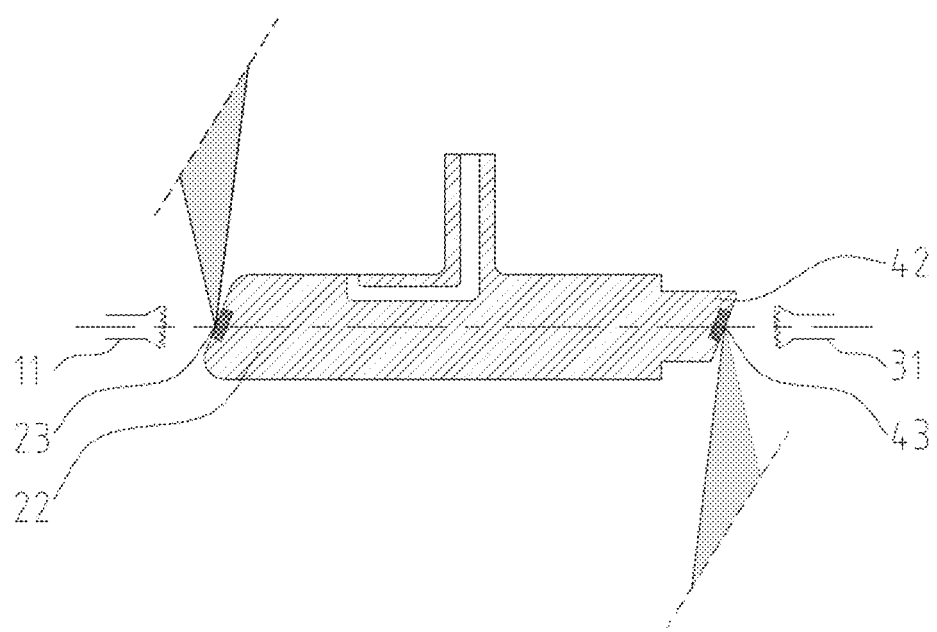
FIG. 6 shows a schematic view of X-ray beams at both ends of the combined scanning X-ray generator according to an embodiment of the present disclosure.

In the embodiment shown in FIG. 6, the X-rays emitted from the first end 20 of the anode are upward, and the X-rays emitted from the second end 40 of the anode are downward. In this embodiment, the end surface of the first end 20 of the anode and the end surface of the second end 40 of the anode face opposite directions. In FIG. 6, the left end surface faces diagonally upward, and the right end surface faces diagonally downward.

In one embodiment, when viewed along the length of the anode, the scanning coverage or scanning range of the pencil X-ray beam emitted from the protective drum exit hole 212 does not overlap, partially overlaps, or completely overlaps the coverage of the fan X-ray beam emitted from the collimator outlet 411. FIG. 7 illustrates the overlapping relationship between the scanning coverage of the pencil X-ray beam emitted from the protective drum exit hole 212 and that of the fan X-ray beam emitted from the collimator outlet 411. FIG. 7 only schematically shows the positional relationship of the X-ray beams at both ends of the combined scanning X-ray generator. Other parts such as the protective drum, the collimator and the like in the view are simplified.

As shown in FIG. 7a, assuming that the scanning range or amplitude of the pencil X-ray beam emitted from the protective drum exit hole 212 corresponding to the first target 23 has an opening angle of $\alpha 1$, the fan X-ray beam emitted from the collimator outlet 411 corresponding to the second target 43 has an opening angle of α2, and an overlapping part of the two X-ray beam opening angles has an angle of α3, as shown in FIG. 7b. Then the effective X-ray beam opening angle α in this specific embodiment is not less than α1 or α2, and the corresponding relationship is:

$$\alpha = \alpha1 + \alpha2 - \alpha3$$

In the above embodiment, the opening angle α1 of the scanning range or amplitude of the pencil X-ray beam emitted from the protective drum exit hole 212 is the same as the opening angle α2 of the fan X-ray beam emitted from the collimator outlet 411. In another embodiment, the opening angle α1 of the scanning range or amplitude of the pencil X-ray beam emitted from the protective drum exit hole 212 is different from the opening angle α2 of the fan X-ray beam emitted from the collimator outlet 411.

In one embodiment, the anode stem 5 may also be configured to be connected to a positive electrode of the high voltage power supply, and in particular, it may be directly grounded for a negative high voltage power supply. The anode stem 5 may be a part of the anode. In other words, the anode is a single piece. In another embodiment, the anode stem 5 may be a component connected to the anode.

The anode and the anode stem 5 may be made of copper or copper alloy. This is conducive to conducting electricity and reducing resistance. Moreover, it is conducive to heat dissipation. In addition, it also has a certain X-ray radiation protection capability.

In one embodiment of the present disclosure, the anode is composed of the first end 20 of the anode and the second end 40 of the anode which are rotatable relative to each other. In this embodiment, a certain angle is rotated between the first end 20 of the anode and the second end 40 of the anode, so that the directions of the protective drum exit hole 212 and the collimator outlet 411 are displaced by a certain angle relative to the original setting. For example, in the initial state, the pencil X-ray beam and the fan X-ray beam respectively emitted by the pencil beam radiation source 1 at the first end 20 of the anode and the fan beam radiation source 2 at the second end 40 of the anode are located in two parallel planes, and the scanning range of the pencil X-ray beam coincide with that of the fan X-ray beam in the direction along the central axis of the anode. By relatively rotating the first end 20 of the anode and the second end 40 of the anode, the scanning range of the pencil X-ray beam and that of the fan X-ray beam may be staggered by a certain angle along the central axis of the anode.

It should be understood that by relatively rotating the first end 20 of the anode and the second end 40 of the anode, the overlap between the scanning range of the pencil X-ray beam and the coverage range of the fan X-ray beam of the combined scanning X-ray generator may be changed at any time according to actual needs.

In one embodiment of the present disclosure, the X-ray tube component of the combined scanning X-ray generator is packaged in the housing 6, or the pencil beam radiation source 1 and the fan beam radiation source 2 may be packaged in two housings respectively sealed and connected with both ends of the anode stem 5.

FIG. 8 is a schematic view of an overall configuration and use method of a dual-channel composite inspection apparatus according to an embodiment of the present disclosure. The dual-channel composite inspection apparatus uses a single combined scanning X-ray generator to generate the pencil X-ray beam and the fan X-ray beam, thereby simultaneously performing the backscatter scanning and the transmission scanning on the targets to be inspected in both inspection channels.

The dual-channel composite inspection apparatus of this embodiment mainly includes a host 320, a backscatter channel 330, and a transmission channel 340. The host 320 is a core component of the dual-channel composite inspection apparatus. The host 320 may include a combined scanning X-ray generator 21, which may have the same structure and functional settings as the combined scanning X-ray generator described above.

The host 320 may also include a front collimator 322 and a backscatter detector 323. The host 320 may also include a console 325, a control module 326, and a data acquisition module 327.

The backscatter channel 330 may include a conveying mechanism 332. When the backscatter target 331 (for example, a human body) is inspected, the backscatter target 331 is placed on the conveying mechanism 332 and moves with the conveying mechanism 332. The transmission channel 340 includes a transmission detector 342 and a conveying mechanism 343. When the transmission target 341 (for example, luggage) is inspected, the transmission target 341 is placed on the conveying mechanism 343 and moves with the conveying mechanism 343.

When inspecting the target to be inspected, the combined scanning X-ray generator 21 and the backscatter detector 323 are located on the same side of the backscatter target 331 and on a fixed bottom support 324. The transmission target 341 placed on the conveying mechanism 343 passes between the combined scanning X-ray generator 321 and the transmission detector 342. The combined scanning X-ray generator 21 generates the pencil X-ray beam to perform the backscatter scanning on the backscatter target 331, and simultaneously generates the fan X-ray beam to perform the transmission scanning on the transmission target 341. The fan X-ray beam refers to an X-ray beam with a fan-shaped profile. A certain included angle (that is, the angle α described later) is formed between a center line of the opening angle of the pencil X-ray beam and that of the fan X-ray beam to avoid crosstalk.

Take a flying spot rotating in the counterclockwise direction shown in FIG. 8 as an example. When the pencil X-ray beam has scanned one column from top to bottom along the backscatter target 331, the fan X-ray beam on the other side of the combined scanning X-ray generator 21 simultaneously completes a cross-sectional scanning on the transmission target 341. Since the center line of the opening angle of the pencil X-ray beam differs from that of the fan X-ray beam by a certain angle in a rotation circumferential direction, there is no signal crosstalk between the backscatter scanning operation and the transmission scanning operation.

At the end of a single stroke of the conveying mechanism 332, the one-side scan of the backscatter target 331 is completed. If the backscatter target 331 needs to be scanned on both sides, the conveying mechanism 332 may carry the backscatter target 331 to return once, so as to scan the other side of the backscatter target 331. It should be noted that when the conveying mechanism 332 starts the return stroke, the backscatter target 331 is turned by 180° so that the other side of the backscatter target 331 faces the combined scanning X-ray generator 21. In contrast, the scanning of all cross-sections of the transmission target 341 can be completed at the end of a single stroke of the conveying mechanism 343. When scanning the target to be inspected, the two detectors 323 and 342 respectively sense corresponding X-ray signals. The console 325 communicates with the control module 326 and the data acquisition module 327, then performs data analysis and processing, and finally generates corresponding backscatter image and transmission image.

In one embodiment, the host 320, the backscatter channel 330 and the transmission channel 340 may be independent devices, or may be assembled in the same cover plate. In addition, the host 320, the backscatter channel 330 and the transmission channel 340 may be located on the same horizontal plane, or may be arranged in other spatial positional relationships.

In one embodiment, the dual-channel composite inspection apparatus of this embodiment performs operations such as electrical wiring in the bottom or top space, and at the same time provides related coupling devices and fastening devices.

In one embodiment, the combined scanning X-ray generator 21 and the backscatter detector 323 are located on the same side of the backscatter target 331 (the right side in FIG. 8). The conveying mechanism 343 for placing the transmission target 341 is located between the combined scanning X-ray generator 21 and the transmission detector 342.

In one embodiment, the backscatter detector 323 receives the X-ray signal scattered from the backscatter target 331, and the transmission detector 342 receives the X-ray signal transmitted through the transmission target 341.

In one embodiment, the console 325 communicates with the control module 326 and the data acquisition module 327. After receiving an inspection instruction, the control module 326 causes the combined scanning X-ray generator 21 to simultaneously emit the pencil X-ray beam and the fan X-ray beam, activates the conveying mechanism 332 and the conveying mechanism 343, and triggers the data acquisition module 327 to collect backscatter signals and transmission signals, then transmits the collected signals to the console 325 for data analysis and processing, and finally generates a backscatter image of the target 331 to be inspected and a transmission image of the target 341 to be inspected. Then, the backscatter image and transmission image generated may be manually inspected or automatically identified with the help of software to distinguish whether there are dangerous goods and appropriately make a mark and alarm.

In one embodiment, the control module 376 may control a starting position, rotation direction and scanning period of the pencil X-ray beam and the fan X-ray beam. In this embodiment, the conveying mechanism 332 and the conveying mechanism 343 are activated simultaneously. Subsequent to the one-side scanning of the backscatter target 331 and the scanning of all cross-sections of the transmission target 341, both the conveying mechanisms 332 and 343 stop moving. After the conveying mechanism 332 stops moving, the backscatter target 331 is turned 180° (for example, if the backscatter target 331 is a human body, the human body is turned 180°), and then the backscatter target 331 is returned with the conveying mechanism 32, thereby performing the scanning of the other side of the backscatter target 331.

In one embodiment, the combined scanning X-ray generator 21 in this embodiment integrates a flying point light source and a fan beam light source on a single X-ray tube. The X-ray tube generates a pencil X-ray beam and a fan X-ray beam with the same or different direction and energy through two target points after the high voltage power supply is switched on.

In one embodiment, the dual-channel composite inspection apparatus of the present disclosure may be an open type or a closed type, and is not restricted by auxiliary components such as a casing, a back plate, or a top cover.

In one embodiment, in the dual-channel composite inspection apparatus of the present disclosure, the position of the combined scanning X-ray generator, the opening angle and energy of the X-ray beam, etc. are not particularly limited, but can be appropriately set according to actual application conditions.

In one embodiment, a transmission detector may be additionally installed at the bottom of the transmission channel according to the characteristics of the opening angle of the transmitted X-rays, so as to form an L shape or other shapes with the existing transmission detector, which may improve detection efficiency.

Above described is a mode in which the host 320 is fixed and the targets 331 and 341 to be inspected in the backscatter channel 330 and the transmission channel 340 are moved with the respective conveying mechanisms. It should be understood that other modes of relative motion can also be used.

In one embodiment, the present disclosure is applicable to the occasions where humans and objects are inspected separately, in which the backscatter part is used for the detection of human body, and the transmission part is used for the detection of luggage, articles, and the like. In addition, the backscatter part can also be used for the detection of human body, and if a suspect is found, the transmission part is used for re-inspection. Of course, the targets to be inspected are not limited to the above-mentioned objects, but can also be animals, goods or vehicles.

In one embodiment, the backscatter channel and the transmission channel may be combined into one channel. In this way, the backscatter detection and transmission detection may be performed for the same target to be inspected at the same time or at different times, thereby improving the detection capability.

The embodiment of the present disclosure only takes a dual-channel composite inspection apparatus as an example. However, the composite inspection apparatus of the present disclosure is not limited to this. In another embodiment, the above-mentioned dual-channel composite inspection apparatus may be cascaded to form a plurality of inspection channels, as shown in FIG. 9. In this case, a part of the inspection channels formed may perform the backscatter detection and/or transmission detection on both sides of the same target to be inspected (for example, the front and back of the human body to be inspected as shown in FIG. 9) at the same time (or at different times). In this way, the target to be inspected usually only needs to be scanned once (that is, the target to be inspected does not need to be returned or turned over) to perform the double-sided scanning. It should be understood that each transmission channel may be used independently, and a full transmission scanning of the target to be inspected can be completed in a single scan. In addition, it should be understood that the number of cascaded channels shown in FIG. 9 is only exemplary and not restrictive. In practical applications, a user/operator of the composite inspection apparatus may appropriately increase or decrease the number of cascaded channels as needed.

Referring to FIG. 10, FIG. 10 shows a composite inspection apparatus for a human body according to an embodiment of the present disclosure. The composite inspection apparatus includes: a scanning X-ray generator configured to independently generate a pencil X-ray beam for backscatter detection and a fan X-ray beam for transmission detection, wherein the pencil X-ray beam can scan a fan area, and the fan X-ray beam has a fan profile covering a fan area; a first detector configured to detect a pencil X-ray beam scattered by the human body; and a second detector configured to detect a fan X-ray beam transmitted through the human body; wherein an inspection channel for the human body to be inspected is defined between the first detector and the second detector.

For example, in the embodiment shown in FIG. 10, the scanning X-ray generator 311 is located on the right side of the figure and emits X-rays toward the left side of the figure. An inspection channel is defined between a first detector 313a for detecting the pencil X-ray beam scattered by the human body and the second detector 313b for detecting the fan X-ray beam transmitted through the human body. The human body may be inspected in the inspection channel.

In other words, the first detector 313a is arranged between the inspection channel and the scanning X-ray generator 311. During inspection, the pencil X-ray beam scans a fan-shaped area, and the scanning range is set as, for example, a fan-shaped area covering the human body. It should be known that the scanning range of the pencil X-ray beam may be set according to the actual situation. When the pencil X-ray beam is incident on the human body, it will be scattered by the human body. The first detector 313a facing the human body 314 can receive the scattered X-ray signal, and convert the received X-ray signal into, for example, an electrical signal, so as to perform the backscatter detection.

The first detector 313a may be, for example, a flat plate shape, as shown in FIG. 11. In the first detector, slits are provided so that the pencil X-ray beam and the fan X-ray beam are projected onto the human body through the first detector.

In FIG. 10, the second detector 313b is arranged on the side of the inspection channel away from the scanning X-ray generator to receive X-rays transmitted through the human body 14, that is, on the left side of the figure. The second detector 313b may be C-shaped, that is, it includes a second detector vertical portion, a second detector upper horizontal portion connected to the second detector vertical portion, and a second detector lower horizontal portion connected to the second detector vertical portion. The shape of the second detector 313b shown in FIG. 10 is only an alternative shape, and the second detector 313b may have other shapes. For example, the second detector upper horizontal portion and the second detector lower horizontal portion are not connected with the second detector vertical portion. The second detector upper horizontal portion, the second detector lower horizontal portion and the second detector vertical portion are only required to cover the X-rays transmitted through the human body. For example, the second detector upper horizontal portion can receive X-rays transmitted through the human head and nearby body parts, and the second detector lower horizontal portion can receive X-rays transmitted through human feet and nearby body parts. The second detector 313b in FIG. 10 is allowed to receive and detect attenuated X-rays after passing through the entire human body, and convert the detected ray signal into, for example, an electrical signal to realize the transmission detection.

In the composite inspection apparatus according to the present disclosure, an electronic control display module 316 may also be included, which is used to interact with the user to control the operation of the composite inspection apparatus and display a result of the inspection, for example, to input a signal which controls the scanning X-ray generator to emit X-rays, including only emitting a pencil X-ray beam or a fan X-ray beam, or simultaneously emitting a pencil X-ray beam and a fan X-ray beam to perform the inspection, and to input other instructions. It may also display a result of the transmission detection and display a result of the backscatter detection, and the like.

In one embodiment, the electronic control display module 316 includes an electrical module 316a, a data acquisition module 316b, a server 316c, an external interface 316d, and a client terminal 316e. The server 316c performs data analysis, processing and imaging on the detection signal, and transmits it to the client terminal 316e in real time through a wired interface or wireless transmission (such as WIFI). The backscatter image and the transmission image may be displayed separately on two displays or simultaneously on one display.

The composite inspection apparatus according to the present disclosure may further includes a conveying device 315 which performs a uniform translational movement along the inspection channel so as to perform the whole body backscatter scanning or transmission scanning of the inspected human body 314 column by column, and then interacts with the user through the electronic control display module 316. The inspection system of the present disclosure is in a single-channel mode, and is not restricted by a presence or absence of auxiliary devices such as a casing, a back plate or a top covers. In this embodiment, the scanning X-ray generator and the detectors remain stationary, and the human body under inspection is moved. Specifically, for example, the conveying device 315 includes a manned skateboard 315a. An armrest is designed on the manned skateboard 315a for an inspected person 314 to grasp, thereby eliminating potential safety hazards such as falling caused by the translational movement. In particular, the conveying device 15 includes a ball screw and a motor drive device 315b, and it can reciprocate. After the inspection of the inspected person 314 is completed, the manned skateboard 315a can return in time to prepare for the next inspection operation. In particular, belt transmission or other transmission methods can also be used.

In other embodiments of the present disclosure, the composite inspection apparatus may include a movable device that can move the scanning X-ray generator and the detectors, so as to scan a stationary human body.

In the composite inspection apparatus according to the present disclosure, the scanning X-ray generator can independently generate the pencil X-ray beam for the backscatter detection and the fan X-ray beam for the transmission detection. This is advantageous. A conventional X-ray generator has only one X-ray emission source, which can emit X-rays of one energy form. When the transmission detection and the backscatter detection need to be performed on the inspected item, the inspected item needs to pass through a transmission detection channel and a backscatter detection channel, because each detection channel can only provide X-rays of one energy form, which causes inconvenience in detection. However, in the composite inspection apparatus of the present disclosure, the scanning X-ray generator can emit X-rays of two energy forms separately, wherein a low-energy pencil X-ray beam can be used for backscatter detection, and the other high-energy fan X-ray beam can be used for transmission detection. Therefore, two detections may be performed with only one detection channel.

However, it should be understood that in other embodiments of the present disclosure, the energy of the pencil X-ray beam and the fan X-ray beam may be adjusted. The energy of the pencil X-ray beam may be higher, and the energy of the fan X-ray beam may be lower.

According to an embodiment of the present disclosure, the composite inspection apparatus can only perform the backscatter detection, for example, only emit the pencil X-ray beam to scan the human body. Since the pencil X-ray beam has small energy and does little harm to the human body, the human body can be initially inspected only by backscattering. After the initial inspection of the human body, if further inspection is required, the composite inspection apparatus according to the present disclosure may perform the transmission detection on the human body without moving the position of the human body. The composite inspection apparatus according to the present disclosure is highly integrated, and the safety and convenience of inspection are improved.

In one embodiment, the composite inspection apparatus further includes a composite inspection apparatus collimator 312. The composite inspection apparatus collimator 312 includes a first collimation slit 312' for collimating the pencil X-ray beam and a second collimation slit 312" for collimating the fan X-ray beam. The pencil X-ray beam and the fan X-ray beam respectively pass through the first collimation slit and the second collimation slit and are projected onto the human body. The first collimation slit and the second collimation slit are separated by a partition. In other words, the first collimation slit 312' and the second collimation slit 312" are dimensioned such that the pencil X-ray beam and the fan X-ray beam emitted by the scanning X-ray generator correspond to the first collimation slit 312' and the second collimation slit 312", respectively. In one embodiment, a lateral width (i.e., the horizontal direction) of the first collimation slit 312' may be 0.5 mm-2 mm, such as 1 mm, and an opening length in the vertical direction may be 1000 mm-2000 mm, such as 1200 mm. A lateral width of the second collimation slit 312" may be 0.5 mm-2 mm, such as 1 mm, and an opening length in the vertical direction is 1000 mm-2000 mm, such as 1200 mm. A partition is arranged between the first collimation slit 312' and the second collimation slit 312" to separate the first collimation slit 312' and the second collimation slit 312" so that the pencil X-ray beam only passes through the first collimation slit 312' and the fan X-ray beam only passes through the second collimation slit 312". A thickness of the partition may be 5 mm-15 mm, for example, it may be 8 mm or 10 mm.

The first collimation slit 312' and the second collimation slit 312" can respectively constrain the pencil X-ray beam and the fan X-ray beam passing through, so that the pencil X-ray beam and the fan X-ray beam have the scanning directions and ranges required by the composite inspection apparatus, thus reducing the radiation damage of the X-rays to the surrounding area.

In one embodiment, the composite inspection apparatus collimator 312 may further include an adjuster 312a, a cross-sectional view of which is shown in FIG. 12, configured to limit a height and width of a source collimator outlet. Four sides of an opening of the adjuster 312a are adjustable so that a size of the opening can constrain the fan X-ray beam to the range required by the composite inspection apparatus. It is advantageous to provide the adjuster 312a, which can flexibly adjust the irradiation range of the radiation beam and reduce the damage to the environment.

In one embodiment, the anode stem 5 may also be configured to be connected to a positive electrode of the high voltage power supply, and in particular, it may be directly grounded for a negative high voltage power supply. The anode stem 5 may be a part of the anode. In other words, the anode is a single piece. In another embodiment, the anode stem 300 may be a component connected to the anode.

The anode and the anode stem 5 may be made of copper or copper alloy. This is conducive to conducting electricity and reducing resistance. Moreover, it is conducive to heat dissipation. In addition, it also has a certain X-ray radiation protection capability.

Another aspect of the present disclosure provides an inspection method for a human body, in which the above-mentioned composite inspection apparatus is used to perform inspection. Since the composite inspection apparatus has the function of emitting X-ray beams of two energy types, the inspection method according to this embodiment has little harm to the human body in use, which improves the convenience.

Specifically, the scanning X-ray generator may first be used to emit the pencil X-ray beam to perform the backscatter detection on each human body to be inspected. The pencil X-ray beam has low energy and little harm to the human body. When no suspicious objects are found, the inspection is completed.

When the human body is found to have a suspicious object, the scanning X-ray generator is used to emit the fan X-ray beam to perform the transmission detection. The fan X-ray beam can pass through the human body and show the object carried by the human body more clearly, which improves the reliability of inspection.

The backscatter detection and transmission detection on the human body may be performed in the same inspection channel without moving, which greatly improves convenience and inspection efficiency.

Although some embodiments of the general concept of the present disclosure have been illustrated and described, it should be understood by those ordinary skilled in the art that these embodiments may be changed without departing from the principle and spirit of the general concept of the present disclosure. The scope of the present disclosure is defined by the claims and their equivalents.

The invention claimed is:

1. A combined scanning X-ray generator, comprising:
a housing;
an anode arranged in the housing, the anode comprising a first end of the anode and a second end of the anode opposite the first end of the anode;
a pencil beam radiation source arranged at the first end of the anode and configured to emit a pencil X-ray beam, wherein the pencil beam radiation source comprises a first cathode configured to emit electrons toward the first end of the anode in the pencil beam radiation source; and
a fan beam radiation source arranged at the second end of the anode and configured to emit a fan X-ray beam, wherein the fan beam radiation source comprises a second cathode configured to emit electrons toward the second end of the anode in the fan beam radiation source;
wherein the pencil beam radiation source and the fan beam radiation source are operated independently.

2. The combined scanning X-ray generator according to claim 1, wherein the anode is configured such that the first end of the anode and the second end of the anode are rotatable relative to each other.

3. The combined scanning X-ray generator according to claim 1, wherein the pencil beam radiation source comprises a first target arranged on an end surface of the first end of the anode, and the first target emits X-rays after being bombarded by the electrons; the fan beam radiation source comprises a second target arranged on an end surface of the second end of the anode, and the second target emits X-rays after being bombarded by the electrons; and wherein the end surface of the first end is not perpendicular to a length extending direction of the anode, and the end surface of the second end is not perpendicular to the length extending direction of the anode.

4. The combined scanning X-ray generator according to claim 3, wherein the combined scanning X-ray generator is configured such that the first target of the pencil beam radiation source and the second target of the fan beam radiation source emit X-rays synchronously or asynchronously.

5. The combined scanning X-ray generator according to claim 3, wherein the combined scanning X-ray generator is configured such that a voltage applied between the first cathode and the first end of the anode is equal to a voltage applied between the second cathode and the second end of the anode, so that the X-rays generated have the same energy; or
wherein the combined scanning X-ray generator is configured such that a voltage applied between the first cathode and the first end of the anode is not equal to a voltage applied between the second cathode and the second end of the anode, so that the X-rays generated have different energies.

6. The combined scanning X-ray generator according to claim 1, wherein the pencil beam radiation source comprises a protective drum configured to modulate the X-rays emitted by the first target into a pencil X-ray beam; and
wherein the fan beam radiation source comprises a collimator configured to modulate the X-rays emitted by the second target into a fan X-ray beam.

7. The combined scanning X-ray generator according to claim 6, wherein the protective drum surrounds the first end of the anode, allowing the electrons to pass through the protective drum to bombard the first target, and restricting the X-rays emitted by the first target, so that the X-rays emitted by the first target are only emitted from a protective drum exit hole to form the pencil X-ray beam.

8. The combined scanning X-ray generator according to claim 6, wherein the pencil beam radiation source further comprises an armature core arranged on the anode near the first end of the anode, an armature winding surrounding the armature core, and a plurality of permanent magnets arranged corresponding to the armature core on an inner wall of the protective drum, so that when the armature winding forms a changing magnetic field, the armature winding interacts with the plurality of permanent magnets to drive the protective drum to rotate around the first end of the anode.

9. The combined scanning X-ray generator according to claim 6, wherein the collimator surrounds the second end of the anode, allowing the electrons to pass through the collimator to bombard the second target, and restricting the X-rays emitted by the second target, so that the X-rays emitted by the second target are only emitted from a collimator outlet to form the fan X-ray beam.

10. The combined scanning X-ray generator according to claim 6, wherein the pencil X-ray beam emitted from the protective drum exit hole and the fan X-ray beam emitted from the collimator outlet are respectively located in two parallel planes.

11. The combined scanning X-ray generator according to claim 6, wherein, viewed in a length extending direction of the anode, a scanning coverage of the pencil X-ray beam emitted from the protective drum exit hole partially overlaps, completely overlaps or does not overlap, that of the fan X-ray beam emitted from the collimation outlet.

12. The combined scanning X-ray generator according to claim 6, wherein a scanning range of the pencil X-ray beam emitted from the protective drum exit hole has an opening angle which is the same as or different from an opening angle of the fan X-ray beam emitted from the collimator outlet.

13. The combined scanning X-ray generator according to claim 1, wherein the anode comprises an anode stem which is connected with the housing to fix the anode inside the housing.

14. The combined scanning X-ray generator according to claim 13, wherein the anode stem comprises a cooling channel configured to flow a cooling medium.

15. A composite inspection apparatus, comprising a plurality of inspection channels and at least one combined scanning X-ray generator according to claim 1,
wherein each of the at least one combined scanning X-ray generator is configured to emit a pencil X-ray beam applicable to perform a backscatter scanning on a target to be inspected in one of the plurality of inspection channels and a fan X-ray beam applicable to perform a transmission scanning on a target to be inspected in another of the plurality of inspection channels.

16. The composite inspection apparatus according to claim 15, wherein each of the at least one combined scanning X-ray generator is configured to emit a pencil X-ray beam and a fan X-ray beam, so that the backscatter scanning and the transmission scanning are performed independently without crosstalk; and
wherein the backscatter scanning and the transmission scanning are performed at the same time or at different times.

17. An inspection method for a target to be inspected by using the composite inspection apparatus according to claim 15, the method comprising:
passing a first target to be inspected through one of the inspection channels, so as to perform a backscatter scanning on the first target to be inspected by using the pencil X-ray beam; and
passing a second target to be inspected through another of the inspection channels, so as to perform a transmission scanning on the second target to be inspected by using the fan X-ray beam.

18. A composite inspection apparatus for a human body, comprising:
the combined scanning X-ray generator according to claim 1, configured to independently generate a pencil X-ray beam for backscatter detection and a fan X-ray beam for transmission detection, wherein the pencil X-ray beam is configured to scan a fan area, and the fan X-ray beam has a fan contour covering a fan area;
a first detector configured to detect a pencil X-ray beam scattered by the human body; and
a second detector configured to detect a fan X-ray beam transmitted through the human body;
wherein an inspection channel for the human body to be inspected is defined between the first detector and the second detector.

19. The composite inspection apparatus according to claim 18, further comprising a composite inspection apparatus collimator comprising a first collimation slit for collimating the pencil X-ray beam and a second collimation slit for collimating the fan X-ray beam, wherein the pencil X-ray beam and the fan X-ray beam respectively pass through the first collimation slit and the second collimation slit to be projected onto the human body, and the first collimation slit and the second collimation slit are separated by a partition.

20. The composite inspection apparatus according to claim 19, wherein the composite inspection apparatus collimator comprises an adjuster configured to limit a height and width of a source collimator outlet; and wherein four sides of an opening of the adjuster are adjustable so that a size of the opening constrains the fan X-ray beam to a range required by the composite inspection apparatus.

* * * * *